US012700302B2

(12) United States Patent
Wang et al.

(10) Patent No.: US 12,700,302 B2
(45) Date of Patent: Aug. 4, 2026

(54) DRIVER AGGRESSION AND ENERGY USE MONITORING DURING USE OF VEHICLE

(71) Applicant: FCA US LLC, Auburn Hills, MI (US)

(72) Inventors: Chunjian Wang, Troy, MI (US); Drushan A Mavalankar, Rochester Hills, MI (US)

(73) Assignee: FCA US LLC, Auburn Hills, MI (US)

( * ) Notice: Subject to any disclaimer, the term of this patent is extended or adjusted under 35 U.S.C. 154(b) by 102 days.

(21) Appl. No.: 18/635,411

(22) Filed: Apr. 15, 2024

(65) Prior Publication Data

US 2025/0322746 A1 Oct. 16, 2025

(51) Int. Cl.
*G08G 1/01* (2006.01)
*G08G 1/052* (2006.01)

(52) U.S. Cl.
CPC ......... *G08G 1/0137* (2013.01); *G08G 1/0112* (2013.01); *G08G 1/052* (2013.01)

(58) Field of Classification Search
CPC ...... B60L 15/20; B60L 15/2045; B60L 50/60; B60L 1/006; B60L 2240/66; G08G 1/0137; G08G 1/0112; B60W 2556/45; B60W 2555/20; B60W 2710/242
USPC .................................................... 701/22, 109
See application file for complete search history.

(56) References Cited

U.S. PATENT DOCUMENTS 6,392,564 B1 5/2002 Mackey et al.
10,040,459 B1 * 8/2018 Kukreja ................. G07C 5/008
11,407,370 B2 * 8/2022 Seger .................. B60R 16/0236
11,508,236 B2 11/2022 Chen et al.
12,152,893 B2 * 11/2024 Zhu .................... G01C 21/3469
2008/0120025 A1 5/2008 Naitou et al.
2010/0131148 A1 5/2010 Camhi et al.
2014/0236466 A1 * 8/2014 Doron .................... G06Q 10/06 701/123
2016/0023554 A1 * 1/2016 Tseng ....................... B60K 6/48 701/22
2017/0183009 A1 6/2017 Isono et al.
2017/0236411 A1 8/2017 Sumers
2017/0309196 A1 10/2017 Vangala et al.
2018/0005254 A1 1/2018 Bai et al.
2018/0126785 A1 * 5/2018 Navarro-Losada ..... B60C 9/185
2019/0185009 A1 6/2019 Werner et al.
(Continued)

FOREIGN PATENT DOCUMENTS

CA 3105835 A1 1/2020
TW I754068 B 2/2022
(Continued)

OTHER PUBLICATIONS

Smith System; Optimize Fleet Performance: "The Effects Of Aggressive Braking And Acceleration"; Jun. 18, 2025, (8 pages).
(Continued)

*Primary Examiner* — Andrew Joseph Rudy
(74) *Attorney, Agent, or Firm* — Jeremy J. Klobucar

(57) ABSTRACT

A method of determining energy use during operation of a vehicle includes determining an aggression rating associated with current use of a vehicle and determining an energy use rating as a function of the aggression rating over a period of time. The determined energy use rating is compared to an energy use threshold, and an output is provided to a driver of the vehicle when the energy use rating exceeds the energy use threshold.

19 Claims, 4 Drawing Sheets

(56) References Cited

U.S. PATENT DOCUMENTS

| | | | | |
|---|---|---|---|---|
| 2019/0291728 | A1 | 9/2019 | Shalev-Shwartz et al. | |
| 2020/0290577 | A1 | 9/2020 | Berntorp | |
| 2021/0125076 | A1 | 4/2021 | Zhang et al. | |
| 2022/0028183 | A1 | 1/2022 | Cha et al. | |
| 2023/0073151 | A1* | 3/2023 | Ucar | B60W 50/14 |
| 2023/0132573 | A1* | 5/2023 | Zabe | F16C 25/04 56/10.2 R |
| 2023/0132673 | A1* | 5/2023 | Russo | B60W 40/09 705/4 |
| 2023/0150394 | A1* | 5/2023 | Diamond | B60L 58/14 701/22 |
| 2023/0230502 | A1 | 7/2023 | Moehr | |
| 2023/0267399 | A1 | 8/2023 | Howard et al. | |
| 2023/0271618 | A1 | 8/2023 | Chandra et al. | |
| 2024/0025418 | A1* | 1/2024 | Liao | G06N 5/01 |
| 2025/0115273 | A1 | 4/2025 | Best et al. | |

FOREIGN PATENT DOCUMENTS

| | | | |
|---|---|---|---|
| WO | WO2019174932 | A1 | 9/2019 |
| WO | WO2020205648 | A1 | 10/2020 |

OTHER PUBLICATIONS

Non-Final Office Action for U.S. Appl. No. 18/635,396 dated Jun. 23, 2025 (28 pages).
Non-Final Office Action for U.S. Appl. No. 18/635,384 dated Jul. 2, 2025, (24 pages).
Non-Final Office Action for U.S. Appl. No. 18/635,424 dated Aug. 25, 2025, (24 pages).
Final Office Action for U.S. Appl. No. 18/635,384 dated Jan. 14, 2026 (36 pages).
Final Office Action for U.S. Appl. No. 18/635,396 dated Jan. 14, 2026 (34 pages).

* cited by examiner

DRIVER AGGRESSION AND ENERGY USE MONITORING DURING USE OF VEHICLE

FIELD

The present disclosure relates to a system for real-time driver aggressiveness and energy use monitoring.

BACKGROUND

Drivers of vehicles vary in their habits, including accelerations, braking, speed and the like. The more aggressive a driver is, the more energy may be used in operation of the vehicle, the less stable the vehicle may be in operation and the vehicle and components thereof may wear out sooner. Many drivers do not understand the extent of their aggressive driving or the effects thereof, including the effect on and increased cost of energy use.

SUMMARY

In at least some implementations, a method of determining energy use during operation of a vehicle, includes determining an aggression rating associated with current use of a vehicle and determining an energy use rating as a function of the aggression rating over a period of time. The determined energy use rating is compared to an energy use threshold, and an output is provided to a driver of the vehicle when the energy use rating exceeds the energy use threshold.

In at least some implementations, the aggression rating is determined as a function of at least a first acceleration threshold that is associated with an increasing vehicle speed. In at least some implementations, the first acceleration threshold is set as a function of a magnitude of acceleration at which a tire of the vehicle will slip magnitude of acceleration at which a tire of the vehicle will slip is determined based upon actuation of a traction control system of the vehicle. In at least some implementations, the first acceleration threshold is set at a magnitude of acceleration below that at which a tire of the vehicle will slip.

In at least some implementations, the method also includes determining a second acceleration of the vehicle, wherein the second acceleration is associated with a decreasing speed of the vehicle, and wherein the aggression rating is determined at least in part as a function of a magnitude of the second acceleration.

In at least some implementations, the method also includes determining a third acceleration of the vehicle, wherein the third acceleration is a lateral acceleration associated with turning of the vehicle, and wherein the aggression rating is determined at least in part as a function of a magnitude of the third acceleration.

In at least some implementations, the energy use rating is set as a function of a baseline energy use level that is less than the energy use threshold. In at least some implementations, the output includes an indication of the energy use rating and the baseline energy use level.

In at least some implementations, the period of time is between 5 seconds and 1 minute.

In at least some implementations, the energy use rating is determined as a function of an average aggression rating over the period of time.

In at least some implementations, the energy use rating is determined as a function of the cumulative amount of time that the energy use rating exceeds the energy use threshold within the period of time.

In at least some implementations, the output includes an estimated vehicle range based compared to a nominal range determined based on a baseline energy use level. In at least some implementations, the output includes information as to how to improve the estimated vehicle range.

In at least some implementations, the method also includes providing a trip report after operation of the vehicle is terminated, wherein the trip report includes information relating to the energy used during the trip starting from turning on the vehicle to turning off the vehicle.

In at least some implementations, a method of monitoring energy use during operation of a vehicle includes monitoring a first acceleration of a vehicle, determining a current aggression rating based at least in part on a magnitude of the first acceleration compared to a baseline aggression rating, and providing an output to a driver of the vehicle including information relating to the current aggression rating. The output includes information relating to energy use as a function of the aggression rating. In at least some implementations, the output provides information relating to a magnitude of vehicle acceleration or deceleration.

DETAILED DESCRIPTION

Figure 1:
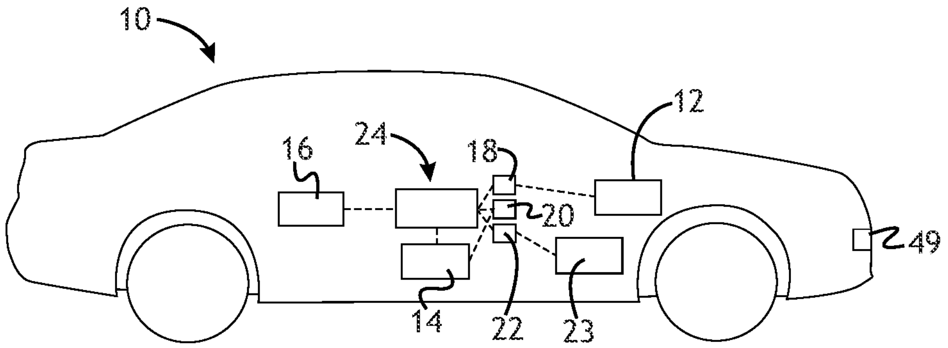
FIG. 1 is a diagrammatic side view of a vehicle including various sensors and systems.

Referring in more detail to the drawings, FIG. 1 illustrates a vehicle 10 that includes a prime mover 12 that may include a combustion engine, one or more electric motors or both an engine and motor(s), as in a hybrid vehicle 10. The vehicle 10 also includes a brake system 14 that functions to slow and stop the vehicle 10. In the example of a combustion engine or hybrid vehicle, a fuel tank may define all or part of a supply 16 of propulsion energy that may be used for propulsion of the vehicle 10. In an electric or hybrid vehicle, one or more batteries define at least part of the energy supply 16 in which electrical energy is stored to power a motor for vehicle propulsion. The vehicle 10 includes a throttle input 18 (e.g. accelerator pedal) and a brake input 20 (e.g. brake pedal) that allow driver controlled operation of the prime mover 12 and the brake system 14, and a steering input 22 (e.g. steering wheel or the like) that permits control of the vehicle direction via a suitable steering system 23. The throttle, braking and steering functions may also be done semi or fully autonomously, if desired.

To control various functions of the vehicle 10, the vehicle 10 has a control system 24, among other things, controls operation of the prime mover 12 of the vehicle 10. For example, the vehicle 10 may include drive by wire, brake by wire and steer by wire systems, or the drive, brake and steering systems may be mechanically linked, as desired, and the control system 24 may be programmed or include instructions to respond to driver action, such as movement of the throttle and brake inputs. The magnitude of the power output from the prime mover 12 and brake system 14 varies as a function of the driver operation of the throttle and brake inputs 18, 20, as well as the instructions executed by the control system 24, which may vary in different circumstances and may be implemented in view of variables and by way of look-up tables, maps, algorithms and the like.

To enable control and monitoring of various vehicle operating, environmental and other conditions related to vehicle operation, the control system 24 may include or be communicated with a range of sensors. By way of some examples, the vehicle 10 may include: a speed sensor 26 that provides an indication of vehicle speed; one or more accelerometers 30 responsive to vehicle accelerations in various directions and orientations; wheel speed sensors 32 responsive to the rotational speed of the vehicle wheels; drive input sensors (separate sensors, collectively referred to as 34) that sense the position and/or rate of movement of the throttle, brake and/or steering inputs 18, 20, 22, position or location sensors 36 or devices (such as GPS or the like) to determine the location of the vehicle; temperature sensors 38 for various things like ambient temperature, engine/motor temperature, battery temperature and the like; steering angle sensor 40 to enable determination of a vehicle steering angle; energy level sensors 42 like a fuel gauge or battery charge sensor that provide an indication of propulsion energy level remaining in the vehicle energy supply; and various other sensors that may be responsive to or useful in determining power output and/or energy consumption from the prime mover 12 (e.g. current draw of motors, or torque sensors).

In order to perform the functions and desired processing set forth herein, as well as the computations therefore, the control system 24 may include, but is not limited to, one or more controller(s), processor(s), computer(s) (generally referred to at 44), DSP(s), memory 46, storage, register(s), timing, interrupt(s), communication interface(s), and input/output signal interfaces, and the like, as well as combinations comprising at least one of the foregoing. For example, the control system 24 may include input signal processing and filtering to enable accurate sampling and conversion or acquisitions of such signals from communications interfaces and sensors. As used herein the terms control system 24 may refer to one or more processing circuits such as an application specific integrated circuit (ASIC), an electronic circuit, a processor (shared, dedicated, or group) and memory that executes one or more software or firmware programs, a combinational logic circuit, and/or other suitable components that provide the described functionality. The control system 24 may be distributed among different vehicle modules, such as an infotainment control module, engine control module or unit, powertrain control module, transmission control module, and the like, if desired, and the memory and one or more processors may be one or both integrated into the vehicle 10 or remotely located and wirelessly communicated to the vehicle 10, as desired.

The term "memory" or "storage" as used herein can include computer readable memory, and may be volatile memory and/or non-volatile memory. Non-volatile memory can include, for example, ROM (read only memory), PROM (programmable read only memory), EPROM (erasable PROM), and EEPROM (electrically erasable PROM). Volatile memory can include, for example, RAM (random access memory), synchronous RAM (SRAM), dynamic RAM (DRAM), synchronous DRAM (SDRAM), double data rate SDRAM (DDR SDRAM), and direct RAM bus RAM (DRRAM). The memory can store an operating system and/or instructions executable by a processor or controller or the like to enable control or allocate resources of a computing device.

Figure 2:
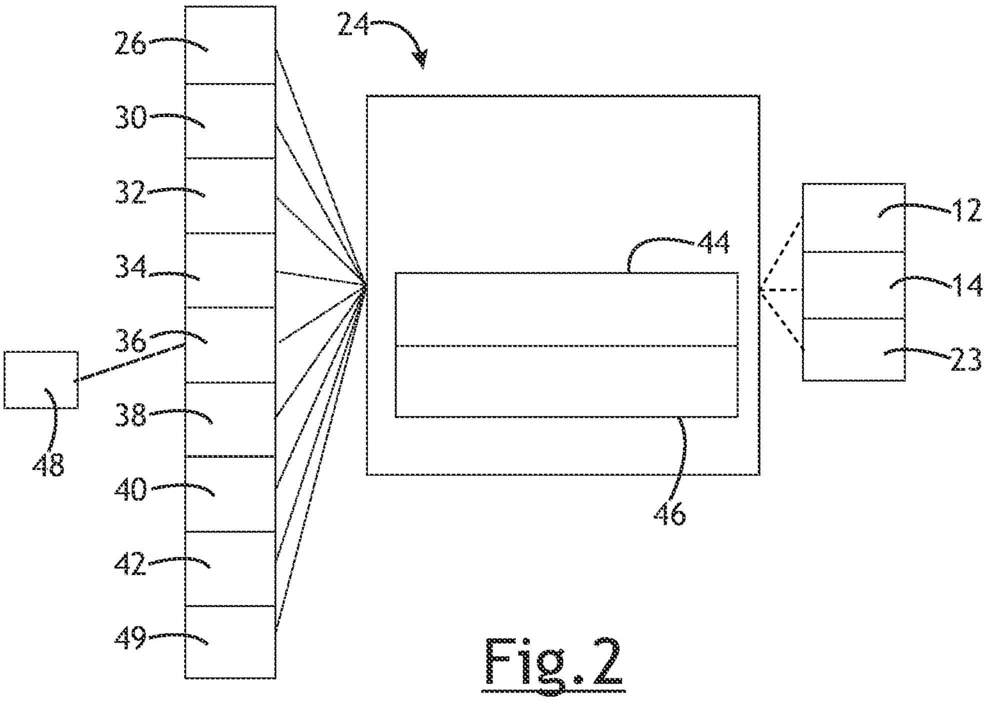
FIG. 2 is a diagrammatic view of a control system and sensors and drive, brake and steering systems.

Various navigation programs 48 (FIG. 2) are known that compute a travel path to a destination, and convey information about the travel path to a driver in the form of visual and/or audible instructions for navigating the vehicle along the travel path. The navigation programs can use information from the location sensor 36 (e.g. GPS) and map data and information relating to road conditions, speed limits, location of intersections and traffic signals, and the level of traffic (such as is available from Waze, GoogleMaps and other applications and sources). This information can be used to define travel paths that are shortest in total distance or time, or that avoid certain road types (e.g. not paved, toll roads, etc) or areas where travel time is less certain, for example, construction zones. The navigation programs 48 may be integrated into the vehicle control system 24 or infotainment system (which may be considered part of the control system), and/or can be resident on a mobile device that is connected to the vehicle 10 by wired or wireless connection.

Navigation programs may use data from numerous tracked vehicles currently traveling along, or that previously traveled along, roads within the travel path to provide crowd-sourced instantaneous and historical information about timing/duration of traffic patterns, average vehicle speeds by road, portions of roads, time of day, day of week, time of year, and the like. From this bulk information provided from many vehicles, the navigation programs can compare different route options that may be used in the travel path, and an estimated total time of travel can be provided, usually in the form of an estimated time of arrival at the chosen destination that is based on travel times and parameters along the entire travel path.

The travel path may include different types of roads, like city roads, rural roads, highways or other higher speed roads, that have different road conditions like speed limits, construction zones, intersections and stopping points which may be defined by traffic signs or traffic lights, for example. In addition to road conditions, the roads may have traffic levels that vary over time and may reduce travel speed as well as the number of stopping, braking and acceleration events when traveling on a road at a given time. Such variables and factors can affect the travel time and may affect the route chosen for the travel path to avoid, for examples, high traffic areas where travel will be slower.

The navigation information and the estimates of time to traverse the entire travel path, and various portions of segments of the travel path, can be less relevant to at least some drivers based on the driving habits of individual drivers. Similar, vehicle range capability (miles that can be traveled on current fuel or energy level in the vehicle 10) can vary considerably based on driving habits. Different rates of accelerations and traveling at different speeds, among other factors, can vary the energy consumption of a vehicle 10. People who drive less aggressively and/or at slower speeds may take longer to move along a travel path and arrive later than estimated by a navigation program. And such people may consume less energy and be able to travel further for a given vehicle energy level such that range estimations suggest unnecessary refueling or recharging iterations. Conversely, people who drive more aggressively and/or at faster speeds may take less time to move along a travel path and arrive earlier than estimated by a navigation program. And such people may consume more energy and be able to travel less distance for a given vehicle energy level such that range estimations do not accurately reflect needed refueling or recharging iterations. In this example, planning a trip to ensure adequate opportunities for refueling or recharging is difficult.

The systems and methods disclosed herein enable, among other things, driver specific driving habits and styles to be determined in real-time, as the vehicle is being driven. The systems and methods may determine one or more accelerations relating to forward acceleration, braking and turning of the vehicle, and from the acceleration data the systems and methods may determine a driver aggression rating. A greater acceleration is evidence of more aggressive driving and results in a higher driver aggression rating. Accelerations at or within a certain threshold of a vehicle maximum acceleration, or beyond a threshold above a road speed limit, by way of non-limiting examples, may result in a higher aggression rating such that the aggression rating need not be linear relative to a magnitude of acceleration or magnitude of another dynamic parameter. The accelerations and aggression rating may be continually monitored and determined, as desired, or the acceleration data may be filtered or averaged over a certain period of time, if desired.

Figure 3:
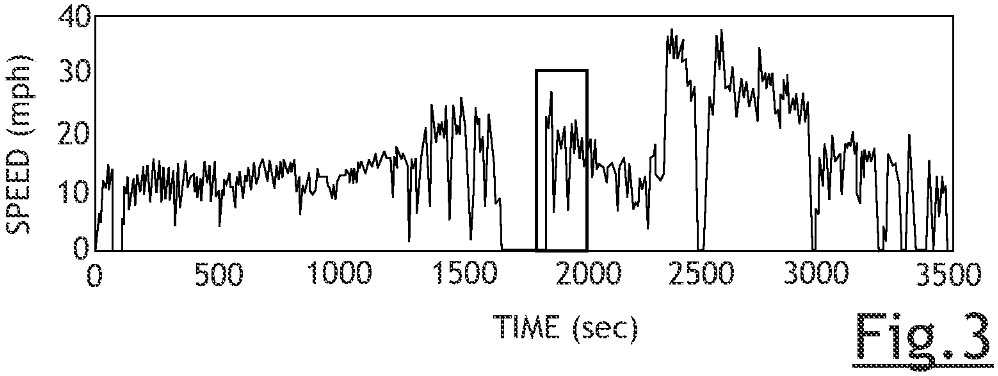
FIG. 3 is a graph of a vehicle speed over time.
Figure 4:
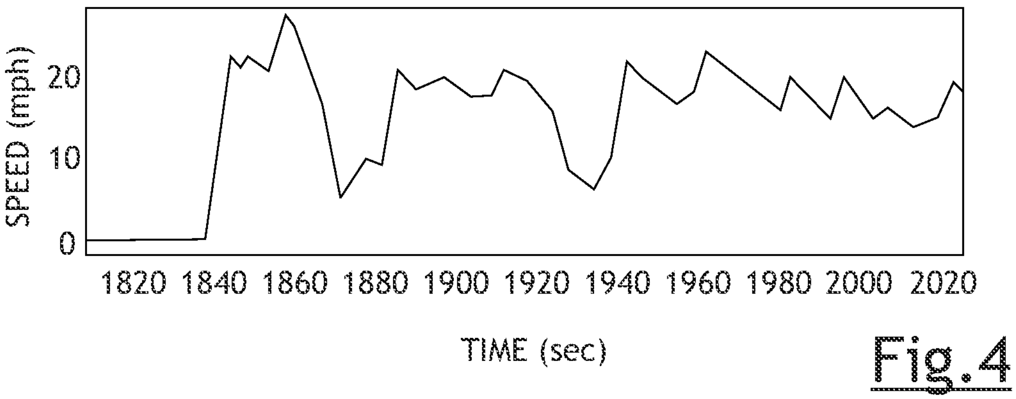
FIG. 4 is an enlarged view of a portion of FIG. 3.
Figure 5:
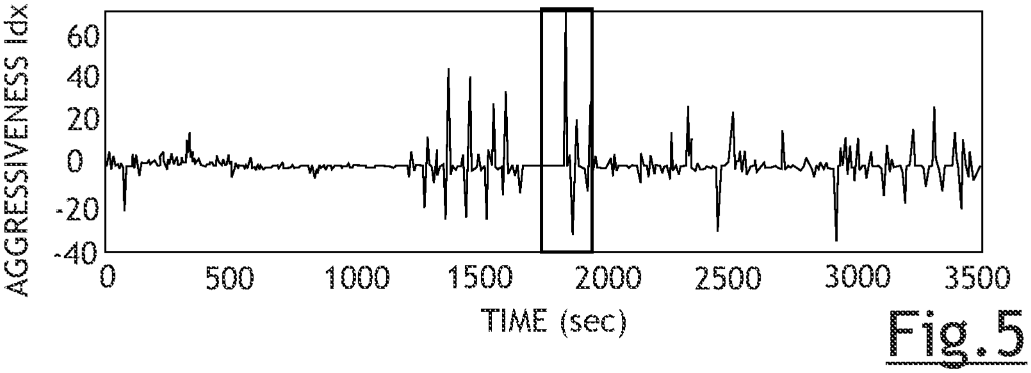
FIG. 5 is a graph of an aggression rating over the time corresponding to the graph of FIG. 3.
Figure 6:
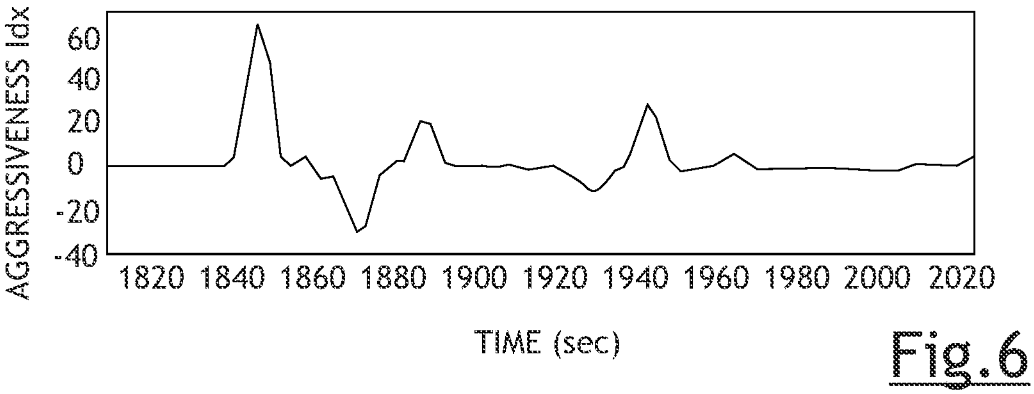
FIG. 6 is an enlarged view of a portion of FIG. 5 and corresponding to the time period shown in FIG. 4.

In at least some implementations, the accelerations of the vehicle are measured directly by the one or more accelerometers and/or by sensors responsive to changes in the position of the acceleration, brake and steering inputs. Forward acceleration may be considered separately from negative acceleration due to braking so that the aggression level or rating can be considered separately for these separate actions. FIG. 3 shows a plot of speeds over a period of time (e.g. accelerations) of a vehicle and FIG. 4 shows the portion of FIG. 3 that is within the rectangle. FIG. 5 shows an aggression rating that is determined by the control system as a function of the accelerations of FIG. 3, and FIG. 6 shows the aggression rating for the shorter time period shown in FIG. 4. In this way, and in this example, accelerations are tracked and forward accelerations result in a positive aggression number and braking accelerations (i.e. decelerations) are given a negative value relative to a baseline aggression rating of zero. In this way both the direction and magnitude can be tracked and may be used in determining an aggression rating, or for other things.

Further, the vehicle speed may be determined and compared to a speed limit for a road on which the vehicle is traveling, and a differential between the vehicle speed and the speed limit may be considered in the determination of an aggression rating. The speed-based aggression rating or portion thereof can be determined as a function of the actual speed differential (e.g. driving 30 mph on a road with a 25 mph speed limit results in a 5 mph differential) or as a function of a percentage difference (in this example, the difference would be 5 mph/25 mph or 20%), or a combination of these two.

The driving data or dynamic parameters of driving, including accelerations and speed, may be monitored continually and in real-time by which it is meant that the sensor signal/data output is collected and may be analyzed while the vehicle is in use, with normal delays for sensor data communication (e.g. signal or output cycle) and controller receipt and processing of the data. The data may be considered without regard to the type of road, time of day, weather and other factors, or these factors may be considered in conjunction with the driving data. In at least some implementations, the control system 24 is enabled to track dynamic parameters during vehicle operation and to associate those dynamic parameters with particular driving scenarios. Data from multiple sensors may be processed by the control system to enable a refined view of a driver's habits or style of driving, such as their relative aggression during driving. The data may be analyzed by a machine learning algorithm arranged to review various driving factors and the dynamic parameters, and to provide an analysis or determination of a driver's aggression.

In at least some implementations, the system defines a baseline for one or more dynamic parameters, and when the vehicle is operated at or below the baseline(s), the driver is given an average or low aggression rating. This baseline aggression rating may be zero on a scale of, for example, zero to one hundred, where one hundred is a maximum aggression rating. This is shown in the example of FIGS. 3-6, at time 1900 to 1920 and time 1980 to 2020. In FIGS. 3 and 4 it can be seen that the vehicle is traveling at a speed of between 10 mph and 20 mph and the aggression rating is zero or nearly zero, because the speed is within the baseline for this driving scenario and the accelerations are within a baseline or threshold range of acceleration. A higher aggression rating of about sixty is determined due to a significant forward acceleration of the vehicle between about time 1840 and about 1845, as shown in FIGS. 5 and 6, and a negative aggression rating of about negative thirty is determined at time 1870 due to a faster than threshold deceleration ending at about that time.

The magnitude of acceleration for a given aggression rating (e.g. positive or negative thirty) could but need not be the same for both forward and braking accelerations. In at least some implementations, the thresholds may be based on an assumed or determined tractive limit of the vehicle. In other words, a maximum aggression score might be determined to occur when forward acceleration causes the vehicle tires to slip or spin on the road. Likewise, a maximum aggression score might be determined to occur when a braking action causes the vehicle tires to slip or slide, or an anti-lock braking system to be actuated. And a maximum aggression score might be determined to occur when a steering action causes the vehicle to slip on the road due to lateral acceleration beyond the vehicle traction limits. Of course, the maximum aggression limit could be set lower than the vehicle traction limits, if desired.

Further, in at least some implementations, the driving factors may alter the thresholds and aggression rating determined by the system. For example, if weather conditions are such that road conditions are wet or snowy or icy, or the ambient temperature is cold and the vehicle tires are cold, or the conditions are otherwise such that the vehicle has less traction than it would on normal, dry road conditions, then the baseline may be reduced. Thus, in conditions in which the vehicle traction is reduced, the limits may be reduced by the system so that the aggression rating is set as a function of the exiting conditions experienced by the vehicle. For example, smaller accelerations on icy roads may be determined to be as aggressive (e.g. assigned as high of an aggression rating) as larger accelerations on dry roads.

Still further, a following distance threshold may be used, where the following distance is the distance of the vehicle to a vehicle ahead of the vehicle in the path of travel. The following distance may be determined by one or more object detection sensors 49 (labeled in FIGS. 1 and 2), such as a camera, radar, lidar or the like sensors that may be used to determine the presence and location of obstacles, the road, lane markers for the road, and the like. The following distance threshold may be set as a function of one or both of the vehicle speed and the driving factors, especially those that reduce vehicle traction. In this way, a certain following distance would provide a higher aggression rating at a higher vehicle speed than at a lower vehicle speed, and a certain following distance would provide a higher aggression rating in reduced traction conditions than in greater traction conditions.

In generally, more aggressive driving uses greater energy and reduces the effective range of the vehicle, and can wear out tires, brakes and other vehicle components more quickly than less aggressive driving. Further, in electric and hybrid-electric vehicles, regenerative braking strategies may be used to charge vehicle batteries and improve vehicle range. A driver who brakes and decelerates the vehicle 10 more rapidly can provide a lower regenerative braking energy recover than a driver who brakes/decelerates over a greater distance and time. These are representative and not limiting examples of how driver habits and style of operating the vehicle 10 can affect energy use and efficiency, and vehicle use and efficiency.

The driver aggression rating and monitoring can be used to more accurately determine a projected energy use of the vehicle and thereby provide a more accurate range estimation to the driver. Further, the system can provide feedback to the driver regarding the level of aggression, including warnings or other information at aggressions ratings above a feedback threshold, for example. This information may be provided in the form of a text message on a vehicle display, an audible message or signal, or tactile feedback such as vibration of a vehicle component (e.g. steering wheel, seat, accelerator or brake pedal), or otherwise as desired. The information can be geared toward reducing the driver's aggressive driving to improve vehicle efficiency and also safety. In addition to this real-time feedback, the system can provide a report to a driver after the vehicle is used. The report can include information relating to, for example, increased energy use and decreased vehicle range, projected increased cost of the trip (e.g. as a function of one or more of energy cost, estimated cost of vehicle component useful reduction (e.g. tires/brakes) and the like). If desired, the report can note instances of decreased vehicle stability, provide guidance on how to reduce aggressive habits and improve vehicle efficiency and safety.

Figure 7:
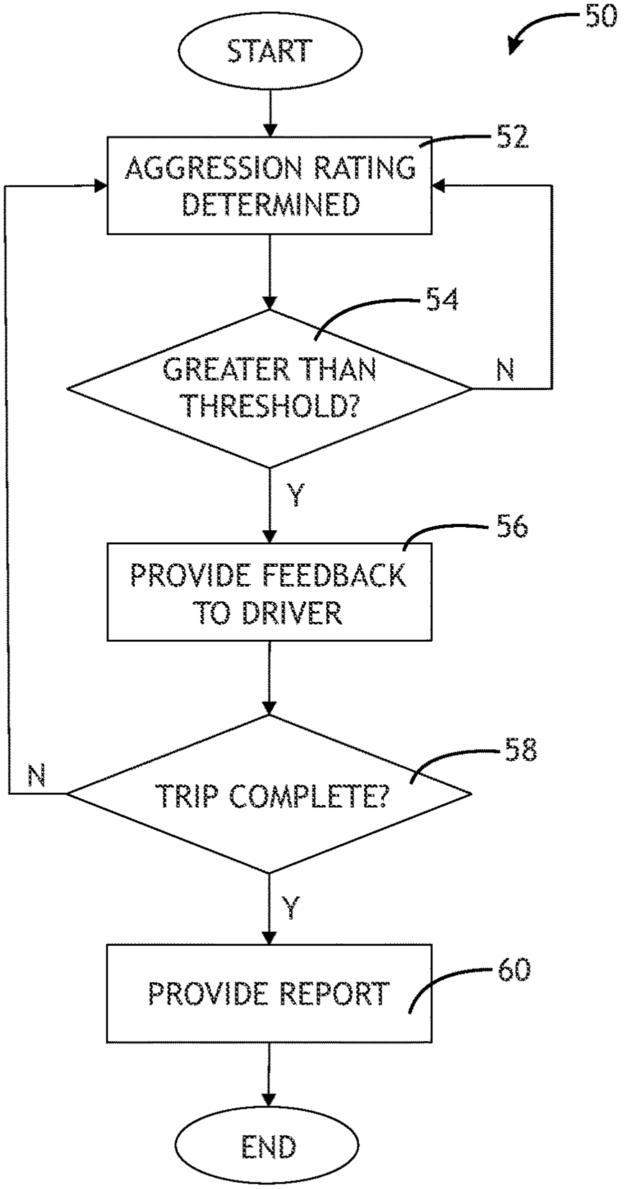
FIG. 7 is a flowchart of a method for determining an aggression rating during use of a vehicle, and providing feedback to a driver.

In the example method 50 of FIG. 7, in step 52 an aggression rating is monitored and determined either continuously or at a desired frequency. In step 54 it is determined if an aggression rating or any monitored dynamic parameter (e.g. acceleration or speed) is beyond a threshold. If not, the method may return to step 52 for continued monitoring of driver aggression and the various dynamic parameters used to determine same. If it is determined in step 54 that a threshold has been exceeded, the method continues to step 56.

In step 56, feedback is provided to the driver, in any desired form. The feedback may be provided at the time of or as close to the time of when the threshold is exceeded so that the driver receives feedback contemporaneously with the driving condition causing the feedback to be provided. In at least some implementations, the feedback is delayed if the system determines that providing the feedback might distract the driver and interfere with safe navigation of the vehicle. This may occur, for example, if a dynamic parameter is determined to be such as to cause or be likely or nearly cause a vehicle instability event in which control of the vehicle may be compromised (e.g. traction loss).

After step 56, the method may continue to step 58 in which it is determined if the vehicle trip is complete. This may be determined by, for example, the vehicle being turned off and/or a driver exiting the vehicle. If the trip is no complete, the method may return to step 52 for continued monitoring of dynamic parameters and driver aggression. If the trip is determined to be complete, the method continues to step 60.

In step 60, a report is provided. The report may, as noted herein, relate to the driver aggression, energy use, safety issues, and the like. And the report may provide coaching and recommendations for improved driving habits, energy use, safety and the like. The report could note a percent or duration of the trip in which the driver was too aggressive, or within a desired aggression range, may include a graph or other visual representation of the accelerations and/or aggression ratings during different portions of the trip, or graphed throughout the trip, as desired.

Figure 8:
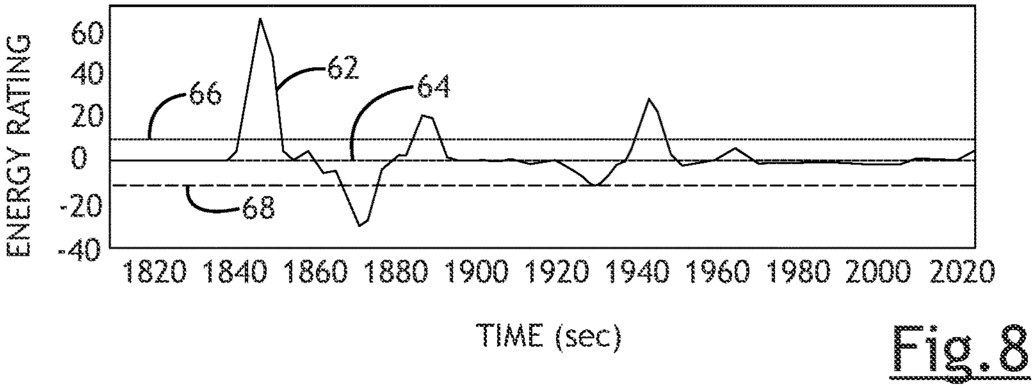
FIG. 8 is a graph of energy use rating over time, including baseline energy use rating and threshold energy use.
Figure 9:
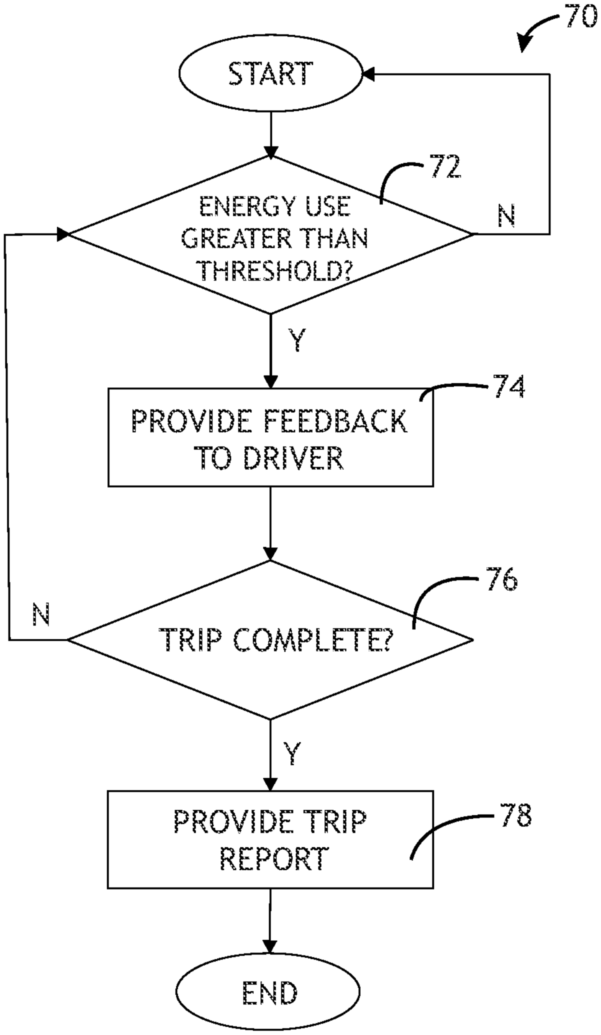
FIG. 9 is a flowchart of a method for determining an energy use rating during use of a vehicle, and providing feedback to a driver

FIGS. 8 and 9 relate to systems and methods of determining energy use during operation of a vehicle. With the aggression rating disclosed above, an energy use rating can be determined as a function of a determined aggression rating. For example, greater forward acceleration, which may be called a first acceleration, results in greater energy use. Further, greater deceleration to slow the vehicle more quickly, can result in less energy recouped by a regenerative braking system, and hence, less overall range for the vehicle. The energy use differences based on accelerations of different magnitude or level may be empirically determined for different vehicles, and an algorithm developed to determine energy use over a wide range of first and/or second acceleration levels. Or, the energy use can be estimated as a function of the energy used during normal operation of the vehicle, within a baseline of aggression, and which is otherwise used by the vehicle to provide an estimated range that the vehicle can travel on the remaining energy supply. In this way, the system may determine a correction factor or differential relating to energy and adjust the vehicle range downwardly when an aggression rating above a baseline or threshold aggression level is determined during use of the vehicle.

FIG. 8 shows by line 62 a plot of an energy use rating over time during use of a vehicle according to the parameters of FIG. 4 and with the aggression rating determined as in FIG. 6. Line 64 represents a baseline energy use rating according to a model based on average use profile or high-efficiency driving behaviors, which may be determined based on the parameters of the vehicle (e.g. motor size, power requirements for nominal accelerations and driving speeds, etc) or empirically determined, for example, and which may be determined as a function of or in accordance with the aggression rating. In the example shown, the baseline energy use rating 64 equates to an aggression rating of zero. The baseline may be set at a level other than zero aggression rating, as desired. For example, vehicle operation relating to a zero aggression rating might not relate to optimal energy use/efficiency, which might be achieved by slower accelerations, in some implementations.

A first threshold for the energy use rating is represented by line 66 and, in the example shown, is a predetermined first differential greater than the baseline energy use rating 64. This first threshold is exceeded when the aggression rating exceeds the baseline rating by the first differential. A second threshold for the energy use rating is represented by line 68 and, in the example shown, is a predetermined second differential greater than the baseline energy use rating 64. This threshold is set as a negative value and relates to decelerations of the vehicle, as noted above with regard to determining the aggression rating during decelerations. The second threshold is exceeded when the aggression rating exceeds the baseline rating by the second differential. The first and second thresholds 66, 68 can but need not be set at the same magnitude relative to the baseline 64. For example, the second threshold 68 may relate to a greater magnitude of acceleration (where deceleration is a negative acceleration) than the first threshold 66 as the energy use differential between the baseline 64 and the first threshold 66 may be greater than between the baseline 64 and the second threshold 68 which relates, for example, to energy regeneration upon braking. That is, more energy may be used during greater positive acceleration than the energy that is gained by slower deceleration, in at least some examples.

As shown by line 62, from time 1810 seconds to 1840 seconds, the current energy use rating 62 matches the baseline energy use rating 64 and is associated with a time period in which an aggression rating of zero or nearly zero has been determined, as shown in FIG. 6. This may occur when the vehicle is operated at a speed and with accelerations that comport with the modeled speed and accelerations for the parameters of vehicle use over this time period. At about time 1840 seconds, the vehicle was rapidly accelerated and the energy rating increased to well above the baseline energy use rating, and quickly also surpassed the threshold energy use rating. At about time 1845, the energy use rating 62 reached a peak and began to decline, but remained above the baseline energy use rating 64 until about time 1855 and was above the first threshold 66 until about time 1850. Between time 1860 and 1880, a deceleration of the vehicle occurred that resulted in an energy rating that exceeded the baseline rating 64 and the second threshold 68 as indicated in FIG. 8.

The example method 70 shown in FIG. 9, determines in step 72 when the current energy use rating 62 exceeds a threshold which may be either the first threshold or the second threshold. When that is determined, the method proceeds to step 74 in which feedback is provided to the driver. The feedback may be in the form of a notice, visual (text, graphic and/or other visual indication) or audible, for example, that indicates to the driver that the vehicle is being operated in a manner that consumes more energy than needed.

This indication could include an estimated range reduction, and estimated instantaneous energy use level (e.g. miles per gallon of fuel or miles per unit of electrical energy), a flashing icon indicating high energy use or other such warning/indication, an estimated cost differential based on an assumed or determined energy cost, or the like. The indication could provide instruction(s) to the driver to decrease acceleration/decelerations, such as "if you accelerate more slowly, you can use less energy and increase the vehicle range by up to 20 miles." Or "if you brake more gradually, you can gain more energy for later use and increase the vehicle range". Of course, the feedback may include other messages or information, as desired. The feedback can indicate to the driver when subsequent accelerations/decelerations are within a threshold range (e.g. the first threshold and second threshold) so the driver can easily determine when their habits have improved. This can provide an incentive for drivers to reduce aggressive driving and strive for more energy efficient and safer driving.

In this method, the system does not respond each time the current energy rating 62 exceeds the baseline energy rating 64, and instead responds only when the first threshold 66 or second threshold 68 are exceeded. In this way, feedback to the driver is provided less frequently and may be less intrusive and less distracting to the driver. The frequency of the feedback may be an option selectable and adjustable by the driver, as can the first and second thresholds, to meet the preferences of the driver with regard to amount and type of feedback.

After feedback is provided to the driver, the method continues to step 76 in which it is determined if the trip is complete, and if so, a trip report may be provided in step 78 or otherwise made available or accessible for later review by the driver. The trip end and report may be determined and provided similarly to that noted above with regard to the method of FIG. 7, and as noted below.

The trip report may include information about both the aggression rating and the energy use ratings determined during the trip. Among other things, the information may inform the driver of a nominal or baseline energy use level for the trip, how the driver's energy use compared, and may provide information as to how to improve energy use during future trips to improve vehicle range and save money on energy for the vehicle. The report may also include information about previous trips and a comparison of the current trip to one or more previous trips so the driver can determine an energy use and/or aggression level over time and whether the driver's habits are improving.

The reports noted herein may be accessible within the vehicle, such as by being displayed on a screen within the vehicle, or provided to a user by email, text, or other communication mode, or it may be obtained from a website or other remote source for later viewing. To facilitate communication and accessibility of the reports, the data and the reports may be stored within the vehicle control system and/or remotely in a remote server like a cloud storage server, which may be communicated with the vehicle via a telematics unit in known manner, and which may be separately accessible by a user via an internet interface in known manner. In at least some implementations, the subject matters in the reports may be chosen/customized by the driver, and the dynamic parameters monitored may also be chosen/customized by the driver. After a report is provided or otherwise made available, the method may end and may re-start again upon keying on the vehicle for a subsequent trip. In addition to the reports, the system may enable production of a report or keeping of data over a number of trips and not just in a single trip. In this way, the aggression rating and driving habits of a driver can be determined over time to show whether driving habits are improving, and if so, to show estimated cost savings, vehicle range improvements, and the like.

The methods and systems described herein may be particularly effective for longer distance trips during which anxiety over the range of a vehicle, particularly an electric vehicle, may be highest. By coaching and providing feedback to a driver, the vehicle range can be extended and the driver can learn better habits for the remainder of the current trip as well as future trips. The feedback can be provided in real-time, which is to say that during or soon after a greater than threshold aggression rating is determined, or a greater than threshold energy use rating is determined, the system can provide feedback. In this way, it is easy for the driver to associate the feedback to a specific acceleration event and this will help the driver determine acceptable levels of accelerations, and acceptable driving habits. While the systems and method might be most useful during longer trips, the systems and methods may be employed during short trips as well, and may be used during all trips, as desired. In this way, the driver can receive feedback during all types of driving scenarios and can improve driving habits accordingly. Further, the energy use rating may be used to adjust, in real-time/during vehicle operation the vehicle range estimation. The feedback provided could show the actual reduction in estimated vehicle range as it occurs.

The methods disclosed herein may include steps that may be carried out in a different order and by systems integrated into the vehicle 10, remote devices that communicate with the vehicle 10, or both. Further, more or fewer method steps may be used in different implementations of the method, as desired. For example, the methods may provide feedback in real-time, after a trip has ended, or both, and need not provide both, as desired. The methods and systems of the disclosure can relate to any type of vehicle, and the vehicles may be used for any purpose.

What is claimed is:

1. A method of determining energy use during operation of a vehicle, comprising:

determining an aggression rating associated with current use of a vehicle, wherein the aggression rating is determined as a function of a magnitude of a first acceleration that is associated with an increasing vehicle speed, and of a magnitude of a second acceleration that is associated with a decreasing vehicle speed, wherein the first acceleration and second acceleration are determined from one or more acceleration sensors of the vehicle and wherein vehicle operation is continuously monitored over a period of time with regard to the first acceleration and second acceleration;

determining an energy use rating as a function of the aggression rating over the period of time;

comparing the energy use rating to an energy use threshold; and providing an output to a driver of the vehicle when the energy use rating exceeds the energy use threshold, and when the aggression rating is at least a threshold amount from a maximum aggression rating.

2. The method of claim 1 wherein the output includes an estimated vehicle range compared to a nominal range determined based on a baseline energy use level.

3. The method of claim 1 wherein a first acceleration threshold is set as a function of a magnitude of acceleration at which a tire of the vehicle will slip, the magnitude of acceleration at which a tire of the vehicle will slip is determined based upon actuation of a traction control system of the vehicle, and the aggression rating is determined as a function of the magnitude of the first acceleration relative to the first acceleration threshold.

4. The method of claim 1 wherein the first acceleration threshold is set at a magnitude of acceleration below that at which a tire of the vehicle will slip.

5. The method of claim 2 wherein the output includes information as to how to improve the estimated vehicle range.

6. The method of claim 1 which also includes determining a third acceleration of the vehicle, wherein the third acceleration is a lateral acceleration associated with turning of the vehicle, and wherein the aggression rating is determined at least in part as a function of a magnitude of the third acceleration.

7. The method of claim 1 wherein the energy use rating is set as a function of a baseline energy use level that is less than the energy use threshold.

8. The method of claim 7 wherein the output includes an indication of the energy use rating and the baseline energy use level.

9. The method of claim 1 wherein the period of time is between 5 seconds and 1 minute.

10. The method of claim 1 wherein the energy use rating is determined as a function of an average aggression rating over the period of time.

11. The method of claim 1 wherein the energy use rating is determined as a function of the cumulative amount of time that the energy use rating exceeds the energy use threshold within the period of time.

12. The method of claim 1 which also includes providing a trip report after operation of the vehicle is terminated, wherein the trip report includes information relating to the energy used during the trip starting from turning on the vehicle to turning off the vehicle.

13. The method of claim 1 which also includes, after providing the output, determining a new aggression rating associated with current use of the vehicle and providing another output when the energy use rating does not exceed the energy use threshold.

14. A method of monitoring energy use during operation of a vehicle, comprising:

monitoring a first acceleration of a vehicle associated with increasing vehicle speed and a second acceleration associated with decreasing vehicle speed;

determining a current aggression rating based at least in part on a magnitude of the first acceleration compared to a baseline aggression rating and based at least in part on a magnitude of the second acceleration, and wherein a maximum aggression rating is determined when either: a) the magnitude of the first acceleration causes a vehicle tire to slip or causes actuation of a vehicle traction control system of the vehicle, or b) the magnitude of the second acceleration causes a vehicle tire to slip or causes actuation of an anti-lock braking system of the vehicle, and wherein the current aggression rating is determined over a period of time between five seconds and one minute;

and providing an output to a driver of the vehicle including information relating to the current aggression rating when the current aggression rating exceeds a baseline threshold, wherein the output includes information relating to energy use as a function of the aggression rating.

15. The method of claim 14 wherein the output provides information relating to a magnitude of vehicle acceleration or deceleration.

16. The method of claim 14 wherein the step of providing the output is not performed when the current aggression rating is at or within a threshold of the maximum aggression rating.

17. The method of claim 14 which also includes determining a third acceleration of the vehicle, wherein the third acceleration is associated with turning the vehicle and wherein the aggression rating is determined at least in part as a function of a magnitude of the third acceleration.

18. The method of claim 14 wherein one of the first acceleration and the second acceleration is given a positive magnitude and the other of the first acceleration and the second acceleration is given a negative magnitude.

19. The method of claim 18 wherein the magnitude of acceleration for a given aggression rating is different for the first acceleration than for the second acceleration.

* * * * *